United States Patent
De La Rue

(10) Patent No.: US 12,065,766 B2
(45) Date of Patent: Aug. 20, 2024

(54) TRILOBAL YARNS FOR APPLICATION ON DENTAL FLOSS, DENTAL FLOSS INCLUDING THE SAME AND USE OF TRILOBAL YARNS IN THE MANUFACTURE OF DENTAL FLOSS

(71) Applicant: PROFIL INDUSTRIA E COMERCIO DE FIOS LTDA, Nova Odessa (BR)

(72) Inventor: Gustavo De La Rue, Americana (BR)

(73) Assignee: PROFIL INDUSTRIA E COMERCIO DE FIOS LTDA, Nova Odessa (BR)

( * ) Notice: Subject to any disclaimer, the term of this patent is extended or adjusted under 35 U.S.C. 154(b) by 0 days.

(21) Appl. No.: 17/561,250

(22) Filed: Dec. 23, 2021

(65) Prior Publication Data

US 2022/0186407 A1  Jun. 16, 2022

Related U.S. Application Data

(63) Continuation of application No. 16/451,840, filed on Jun. 25, 2019, now abandoned.

(30) Foreign Application Priority Data

Jun. 26, 2018 (BR) .......................... 1020180131133

(51) Int. Cl.
*D02G 3/34* (2006.01)
*A61C 15/04* (2006.01)
(Continued)

(52) U.S. Cl.
CPC ............. *D02G 3/34* (2013.01); *A61C 15/041* (2013.01); *D01D 5/08* (2013.01); *D02G 3/02* (2013.01);
(Continued)

(58) Field of Classification Search
CPC . D02G 3/02; D02G 3/34; D02G 3/448; A61C 15/041; D01D 5/24; D01D 5/253
See application file for complete search history.

(56) References Cited

U.S. PATENT DOCUMENTS 2,939,201 A    6/1960   Holland
3,525,134 A *   8/1970   Coon ...................... D02G 1/161
                                                  28/273

(Continued)

FOREIGN PATENT DOCUMENTS

BR    PI0905828 A2   7/2011
EP       0750691 A1   1/1997

(Continued)

OTHER PUBLICATIONS

European Application No. 19181867.3, European Search Report and Opinion, mailed Nov. 8, 2019.

*Primary Examiner* — Shaun R Hurley
(74) *Attorney, Agent, or Firm* — MARSHALL, GERSTEIN & BORUN LLP

(57) ABSTRACT

The present invention refers to yarns made of hollow trilobal cross section filaments, comprising from 90 to 99% of polypropylene, and between 1 and 10% of other polyolefin resins, for the application on dental floss. This invention additionally refers to the production process of the yarns made of hollow trilobal cross section filaments. This invention additionally refers to dental floss comprising hollow trilobal cross section filaments, and the use of hollow trilobal cross section filaments for the manufacture of dental floss. The yarn described in this invention has linear density or title in the range from 400 to 1200 dtex, and it is twisted with a twist level from 10 to 160 twists per meter.

14 Claims, 1 Drawing Sheet

(51) Int. Cl.
*D01D 5/08* (2006.01)
*D02G 3/02* (2006.01)
*D02G 3/44* (2006.01)

(52) U.S. Cl.
CPC ....... *D02G 3/448* (2013.01); *D10B 2321/022* (2013.01); *D10B 2509/00* (2013.01)

(56) References Cited

U.S. PATENT DOCUMENTS

| | | | | |
|---|---|---|---|---|
| 4,646,766 A * | 3/1987 | Stallard | ................... | A61K 8/02 428/364 |
| 4,770,938 A | 9/1988 | Peterson et al. | | |
| 5,025,815 A * | 6/1991 | Hill | ................... | A24D 3/08 131/331 |
| 5,380,592 A * | 1/1995 | Tung | ................... | D01D 5/253 428/397 |
| 5,604,036 A | 2/1997 | Price et al. | | |
| 5,711,935 A * | 1/1998 | Hill | ................... | A61C 15/042 156/169 |
| 5,875,797 A * | 3/1999 | Chiang | ................ | A61C 15/041 132/321 |
| 5,908,039 A * | 6/1999 | Ochs | ................... | A61C 15/041 429/49 |
| 6,027,592 A * | 2/2000 | Tseng | ................... | A61C 15/041 156/244.11 |
| 6,048,615 A * | 4/2000 | Lin | ................... | D01D 5/253 428/397 |
| 6,555,588 B2 * | 4/2003 | Gorski | ................... | B29B 17/02 521/42.5 |
| 7,087,303 B2 * | 8/2006 | Tung | ................... | D01D 5/24 428/397 |
| 7,174,903 B2 * | 2/2007 | Longoni | ................ | D02G 3/346 132/321 |
| 2003/0157319 A1* | 8/2003 | Boyle | ................... | D01D 5/253 264/103 |
| 2006/0012072 A1* | 1/2006 | Hagewood | ............ | D01D 5/082 425/382.2 |
| 2011/0044916 A1 | 2/2011 | Kohli et al. | | |
| 2011/0287210 A1* | 11/2011 | Tung | ................... | D01D 4/02 428/398 |
| 2017/0002117 A1* | 1/2017 | Layman | ................ | B29B 17/00 |
| 2019/0047201 A1* | 2/2019 | Neuman | ................ | B29C 48/17 |

FOREIGN PATENT DOCUMENTS

WO 99/05986 A1 2/1999
WO WO-2007061384 A1 * 5/2007 ............. A61C 15/00

\* cited by examiner

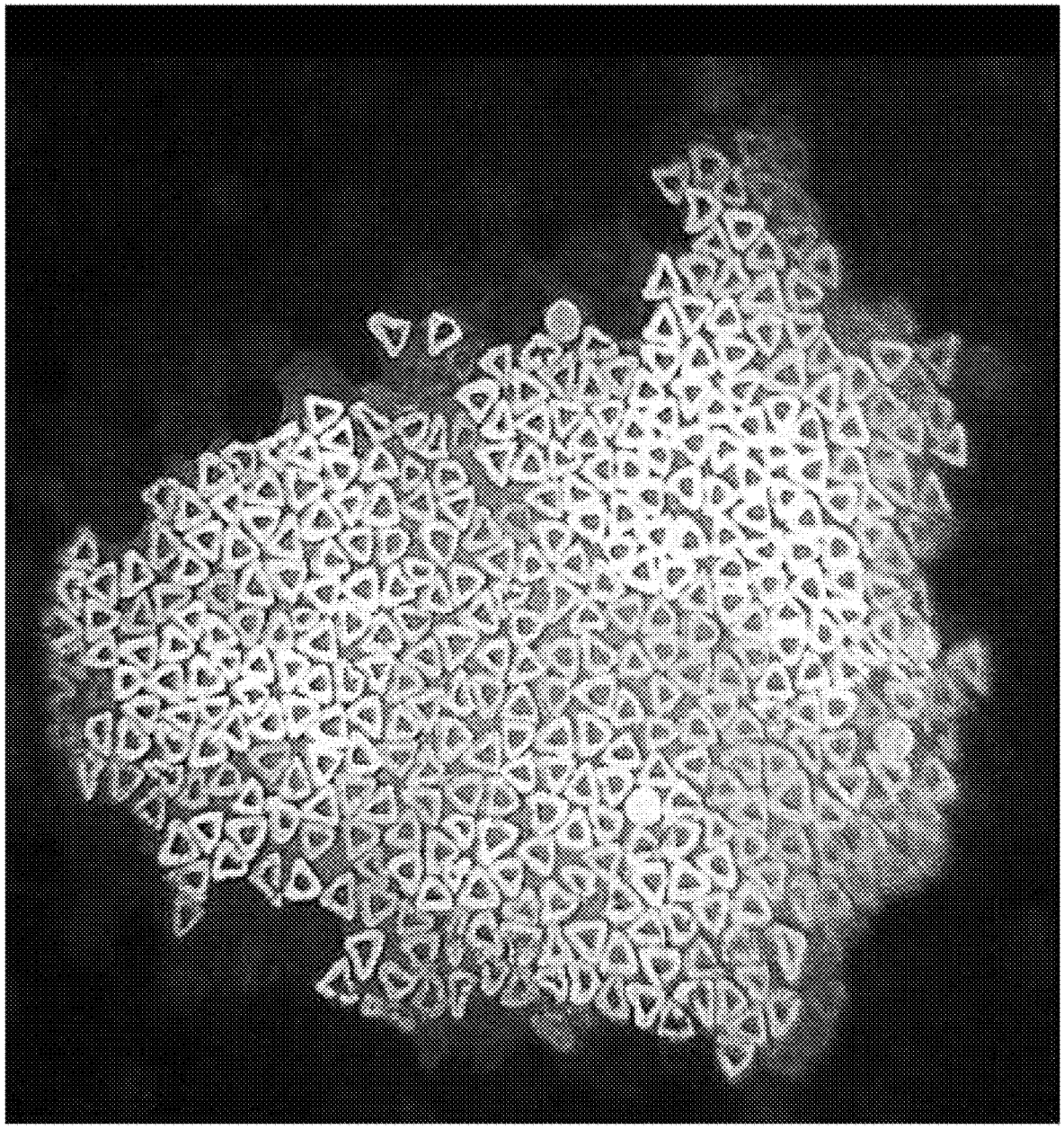

TRILOBAL YARNS FOR APPLICATION ON DENTAL FLOSS, DENTAL FLOSS INCLUDING THE SAME AND USE OF TRILOBAL YARNS IN THE MANUFACTURE OF DENTAL FLOSS

CROSS REFERENCE TO RELATED APPLICATIONS

This application is a continuation of U.S. patent application Ser. No. 16/451,840 filed Jun. 25, 2019, which claims the benefit of priority from Brazil Patent Application No. BR102018013113-3 filed Jun. 26, 2018, the respective disclosures of which are each incorporated herein by reference in their entireties.

FIELD OF THE INVENTION

The present invention is about a continuous filament yarn with trilobal cross section for application on dental floss, and a dental floss manufactured with this mentioned yarn.

BACKGROUND OF THE INVENTION

Bacterial Plaque, also known as Dental Plaque, Microbial Plaque, Oral Biofilm, Dental Biofilm or Bacterial Plaque Biofilm, is a biofilm formed by bacteria and food residue that is formed on the surface of the teeth, this plaque is the main cause for dental decay and gum disease. This plaque in the early stage is a sticky colourless deposit, but If this plaque is not removed daily, it grows and hardens forming the tartar. Dental Floss and/or Dental Tape are important oral hygiene tools to avoid the Bacterial Plaque.

There are many types of Dental Floss known. Between them there are continuous synthetic yarns, made of monofilaments of PTFE (polytetrafluorethylene), and there are Dental Floss made of continuous synthetic yarns made of PA (polyamide) multifilaments, which is made of several filaments bunched together in one single cable, to make a single yarn. The PA dental floss can be waxed or not, with a wide variety of flavours. The PTFE monofilaments slide easier between the teeth than the multifilaments, which sometimes can shred or rip. The tapes are flatter and thinner, with the goal to reach a wider area, but it has more difficult to reach the interdental space.

Trilobal filaments and synthetic fibres are very well known for its textile application. Filaments and fibres with trilobal section are known for its increased gloss and brightness when compared to the same filaments and fibres with round cross section, and this is the main purpose to use this trilobal cross section, because the light reflection in the yarn surface is less diffuse, the light reflected is more oriented due to the trilobal yarn surface geometry. The hollow cross sections are used to reduce the textile material density, and to improve the thermal insulation property, because the internal channel inside the hollow filaments and fibres is filled with air.

In the case of the present invention, the purpose of the hollow trilobal cross section is not the same of those mentioned above. In the Dental Floss application, it is proved that the trilobal cross section is more abrasive when compared with the traditional round cross section, and this property improve the efficiency of the bacterial plaque and food residues removal from the interdental space.

The hollow trilobal cross section yarn has more volume when compared with a traditional solid round cross section yarns and even when compared with solid trilobal cross section yarn. It has been proved that this increased volume improves the bacterial plaque and food residues removal from the interdental space.

U.S. Pat. No. 2,939,201 refers to novel trilobal synthetic filaments and fibres having improved optical properties and improved resistance to soiling when incorporated in textile materials.

U.S. Pat. No. 4,770,938 refers to a trilobal, synthetic fibre, intended for use in carpets, having an axially extending hole in each lobe, the total cross-sectional area of the fibre being about 5 to 12 percent void, said fibre cross-section having a modification ratio of between about 2 to 3, and an arm angle of about 15% to 45%, so that a fibre having improved bulk, soil hiding and resiliency is apparent in a carpet having face fibre of said fibre.

EP750691 refers to a melt spinning process and the nylon hollow filaments and yarns made by such process which includes extruding molten nylon polymer having a relative viscosity (RV) of at least about 50 and a melting point (TM) of about 210 DEG C. to about 310 DEG C. from a spinneret capillary orifice with multiple orifice segments providing a total extrusion area (EA) and an extrusion void area (EVA) such that the fractional extrusion void content, defined by the ratio [EVA/EA] is about 0.6 to about 0.95, and the extent of melt attenuation, defined by the ratio [EVA/(dpf)S], is about 0.05 to about 1.5, in which (dpf)S is the spun denier per filament, the (dpf)S being selected such that the denier per filament at 25% elongation (dpf)25 is about 0.5 to about 20 denier; withdrawing the multiple melt streams from the spinneret into a quench zone under conditions which causes substantially continuous self-coalescence of the multiple melt streams into spun filaments having at least one longitudinal void and a residual draw ratio (RDR) of less than 2.75; and stabilizing the spun hollow filaments to provide hollow filaments with a residual draw ratio (RDR) of about 1.2 to about 2.25.

US2011044916 refers to a dental floss comprising a basic amino acid or salt thereof. The said dental floss may be produced from nylon, or from polytetrafluoroethylene (PTFE or Teflon®), polypropylene, polyethylene, styrene butadiene copolymers, or a combination of them. The polymer is melted and extruded into thin strands, like the dental floss described in this invention.

U.S. Pat. No. 4,646,766 refers to a dental tape made from polypropylene. The tape may be made by extruding a polypropylene film in strip form onto chilled take-off ropers and then roll embossing the film by means of hardened steel rollers.

Brazilian patent application PI0905828 refers to a dental floss with improved dental cleaning efficiency and improved adaptation to the interdental space, by the presence of axial flexible saliences, so that by the dental floss movement between teeth, the secondary yarn can penetrate, and by flexible expansion of the dental floss, reach interdental spaces that a traditional dental floss could not reach.

SUMMARY OF THE INVENTION

The present invention refers to a yarn with hollow trilobal cross section for the application on dental floss, as well as the application of trilobal filaments on dental floss.

The present invention additionally refers to dental floss comprising hollow trilobal cross section filaments.

The present invention additionally refers to the production process of the hollow trilobal cross section filaments.

DESCRIPTION OF THE DRAWINGS

FIG. 1 is a picture of a hollow trilobal cross section made by microscope.

DETAILED DESCRIPTION OF THE INVENTION

A real example of the present invention is a yarn made of continuous filaments with hollow trilobal cross section, containing from 90 to 99% polypropylene (PP), and between 1 to 10% other polyolefin based masterbatches (pigments), being preferred 95% polypropylene (PP) and 5% polyolefin resin, particularly polyethylene (PE), for the application on dental floss.

The dental floss object of this invention comprises yarns made of continuous filaments with hollow trilobal cross section containing from 90% to 99% polypropylene (PP), and between 1 to 10% other polyolefin based masterbatches (pigments), being preferred 95% polypropylene (PP) and 5% polyolefin resin, particularly polyethylene (PE).

Some advantages presented by the dental floss object of the present invention are: Improved capacity of bacterial plaque removal due to the filaments cross section shape, and additionally this improvement is enhanced more 40% when the yarn is additivated with special pigments for this application, like: Pigment Blue 15:3 C.I. 74160, Pigment Green 7 C.I. 74260, Pigment Red 149 C.I. 71137 and Pigment White 6 C.I. 77891; Increased wax and flavours pick up capacity; Better comfort and ease of use for the consumer, due to the increased filament flexibility provided by the hollow cross section; Less weight (for the dental floss producer, who sells the dental floss by meter), provided by the hollow cross section yarn, having more bulk and less weight.

Beyond the cited advantages, the dental floss object of the present invention deforms elastically its cross cut section when it is forced to pass between tight interdental space, making easier and more comfortable the cleaning procedure made by the consumer, when compared with the traditional dental floss made with solid cross section filaments.

The yarn object of the present invention has a linear density or title in the range between 400 and 1200 dtex, it is twisted with a twist level between 10 and 160 twists per meter, in order to increase its strength during its use. The twisted yarn has an increased protection against the breaking or tearing of individual filaments or even the whole yarn when it is subjected to friction. Specifically to the subject of the present invention, said friction occurs between the yarn and the teeth, during the tooth cleaning procedure made by the consumer, when the yarn is forced to pass through interdental space.

Another statement of the present invention is the hollow trilobal filament production process. This referred process comprises the following steps:
multifilament melt spinning using synthetic resins as raw material;
to feed the extrusion melt spinning machine with raw material in form of polypropylene in pellets;
to melt the polypropylene in the extruder and, when applied, in this step is dosed the pigment masterbatch (1 to 10%), to obtain coloured yarn in different colours;
to pump the molten mass throughout the spinnerets, to generate a product in form of continuous filament yarn;
cool down the hot molten filaments with air to turn it solid, and subsequently lubricate, draw, tangle the filaments with air, and finally wind the yarn onto paper tubes;
to twist the yarn with 10 to 160 twists per meter.

The present invention additionally refers to the use of hollow trilobal cross section filaments for the manufacture of dental floss.

EXAMPLES

Find below the technical data of 2 dental floss products experimentally produced:

TABLE 1

| | | Dental Floss | |
|---|---|---|---|
| Item | Unity | 500/160 | 700/320 |
| Composition | — | 100% PP | 100% PP |
| Linear Density (Title) | dtex | 490 to 520 | 690 to 720 |
| Number of filaments | Number | 160 | 320 |
| Cross section | — | hollow trilobal | hollow trilobal |
| Breaking strength | N | >18 | >26 |
| Tenacity | cN/dtex | >3.5 | >3.5 |
| Elongation | % | 20 a 40 | 20 a 40 |
| Twist level | twists/meter | 65 | 65 |

The invention claimed is:

1. A yarn comprising a plurality of filaments entangled with one another, each filament having a hollow trilobal cross-section and a single centrally disposed opening, and each filament comprising polypropylene and a masterbatch comprising a polyolefin resin, wherein the yarn is twisted with a twist level between 65 and 160 twists per meter, wherein the yarn has a linear density of 400 dtex to 1200 dtex.

2. The yarn of claim 1, wherein the polyolefin resin is polyethylene.

3. The yarn of claim 1, wherein the masterbatch further compromises one or more pigments.

4. The yarn of claim 1, wherein a ratio of an amount of the polypropylene an amount of the masterbatch in each filament is 90:10 to 99:1.

5. A dental floss formed from the yarn of claim 1.

6. A yarn comprising a plurality of filaments entangled with one another such that each filament is in contact with one or more adjacent filaments, each filament being hollow such that the yarn has a plurality of apertures, and each filament having a trilobal cross-sectional shape with a single centrally disposed opening, wherein each filament is formed from polypropylene and optionally a masterbatch comprising a polyolefin resin wherein the yarn is twisted with a twist level between 65 and 160 twists per meter, wherein the yarn has a linear density of 400 dtex to 1200 dtex.

7. The yarn of claim 6, wherein each filament is formed of the polypropylene and the masterbatch comprising the polyolefin resin and a ratio of an amount of the polypropylene an amount of the masterbatch in each filament is 90:10 to 99:1.

8. The yarn of claim 7, wherein the polyolefin resin is polyethylene.

9. The yarn of claim 6, wherein each filament is formed from polypropylene and the masterbatch comprising a polyolefin resin, and the masterbatch further compromises one or more pigments.

10. A dental floss formed from the yarn of claim 6.

11. A process for manufacturing a yarn comprising a plurality of filaments entangled with one another and each having a hollow trilobal cross-section, comprising:
- melting a raw material in an extruder of a melt spinning machine to obtain a molten mass, the raw material comprising polypropylene pellets and optionally a pigment masterbatch comprising a polyolefin resin and pigment;
- pumping the molten mass through spinnerets of the melt spinning machine to thereby produce filaments that are each hollow and have a trilobal cross-section and a single centrally disposed opening;
- cooling the filaments to solidify the filaments;
- entangling the filaments with air; and
- twisting the entangled filaments to form the yarn with a twist level between 65 and 160 twists per meter, wherein the yarn has a linear density of 400 dtex to 1200 dtex.

12. The process of claim 11, wherein the raw material comprises the polypropylene pellets and the pigment masterbatch.

13. The process of claim 12, wherein the pigment masterbatch comprises polyethylene.

14. The process of claim 11, further comprising lubricating the filaments prior to entangling the filaments with air.

* * * * *